United States Patent [19]
Heule et al.

[11] 3,881,481
[45] May 6, 1975

[54] LEFT VENTRICULAR EJECTION METER

[75] Inventors: James E. Heule, Plymouth Village; Richard C. Gaard, Golden Valley, both of Minn.

[73] Assignee: Audronics, Inc., Minneapolis, Minn.

[22] Filed: Feb. 8, 1973

[21] Appl. No.: 330,746

[52] U.S. Cl............................ 128/2.05 V; 128/2.05 P
[51] Int. Cl.............................................. A61b 5/02
[58] Field of Search..... 128/2.05 A, 2.05 D, 2.05 E, 128/2.05 F, 2.05 G, 2.05 M, 2.05 N, 2.05 P, 2.05 Q, 2.05 R, 2.05 T, 2.05 V, 2.06 R

[56] References Cited
UNITED STATES PATENTS

| | | | |
|---|---|---|---|
| 3,139,086 | 6/1964 | Botsch et al. | 128/2.05 P |
| 3,230,951 | 1/1966 | Teschner | 128/2.05 P |
| 3,400,709 | 9/1968 | Funfstuck | 128/2.05 A |
| 3,628,525 | 12/1971 | Polanyl et al. | 128/2.05 P |
| 3,698,382 | 10/1972 | Howell | 128/2.05 F |

FOREIGN PATENTS OR APPLICATIONS

| | | | |
|---|---|---|---|
| 987,504 | 3/1965 | United Kingdom | 128/2.05 P |

OTHER PUBLICATIONS
Rentsch, "Medical & Biological Engineering," Vol. 10, No. 972, pp. 301-305.

*Primary Examiner*—William E. Kamm
*Attorney, Agent, or Firm*—Hall & Sjoquist

[57] ABSTRACT

A meter for measuring the heart left ventricular ejection characteristic. The meter includes a circuit for emphasizing the left ventricular ejection phase preferentially to the other heart beat phases. According to a preferred embodiment, a circuit is provided which emphasizes signals of a blood volume waveform sensed by a pulsed light, source, photoelectric probe in a range of about 3.75 to 6.75 hertz.

6 Claims, 4 Drawing Figures

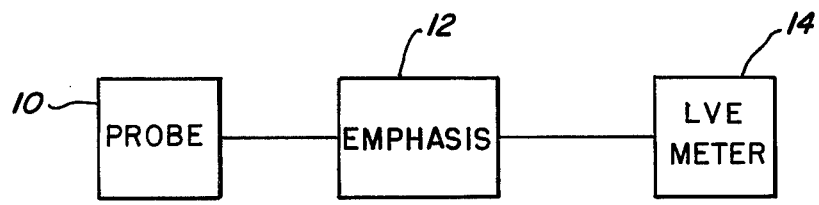
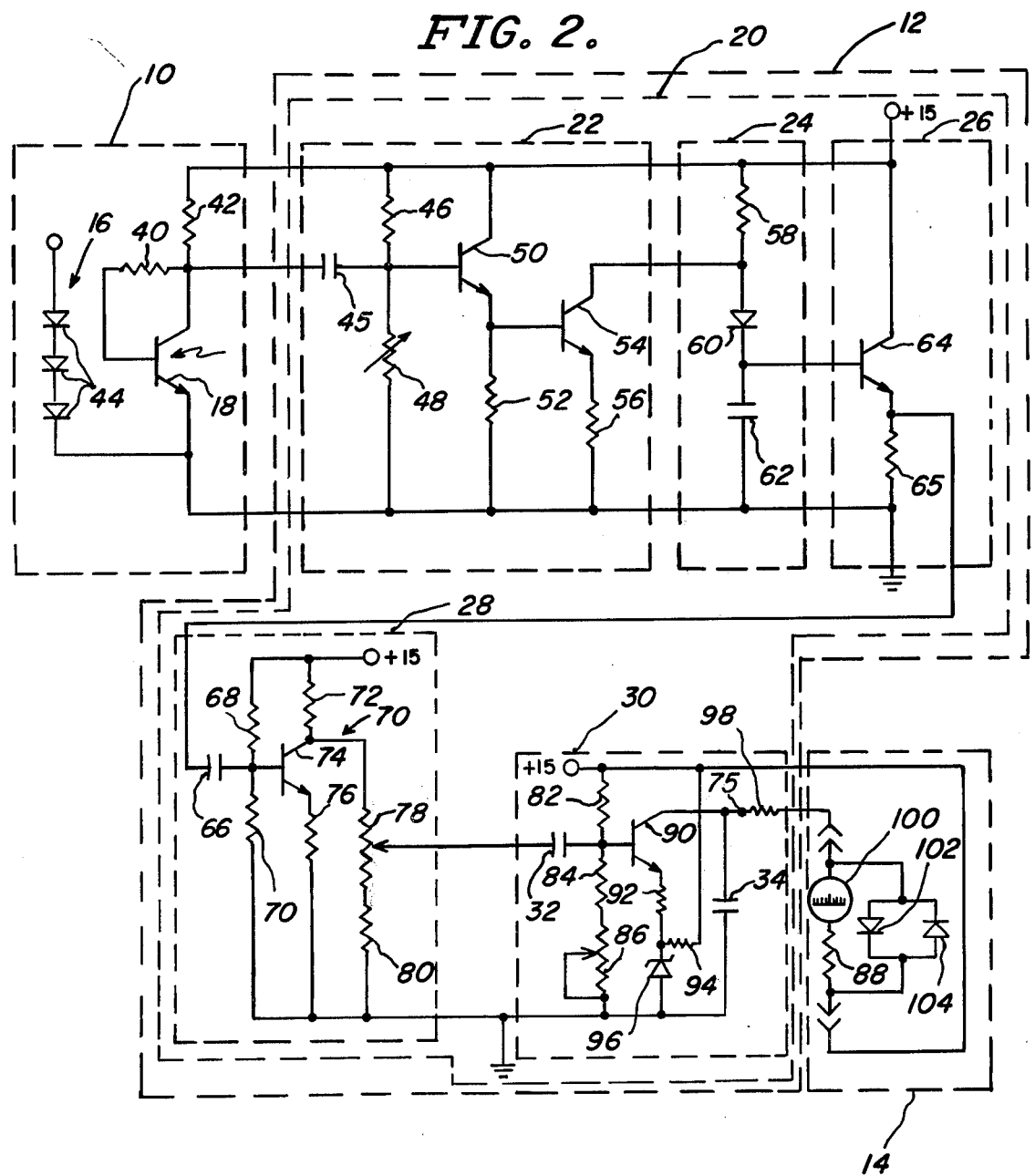

FIG. 4.
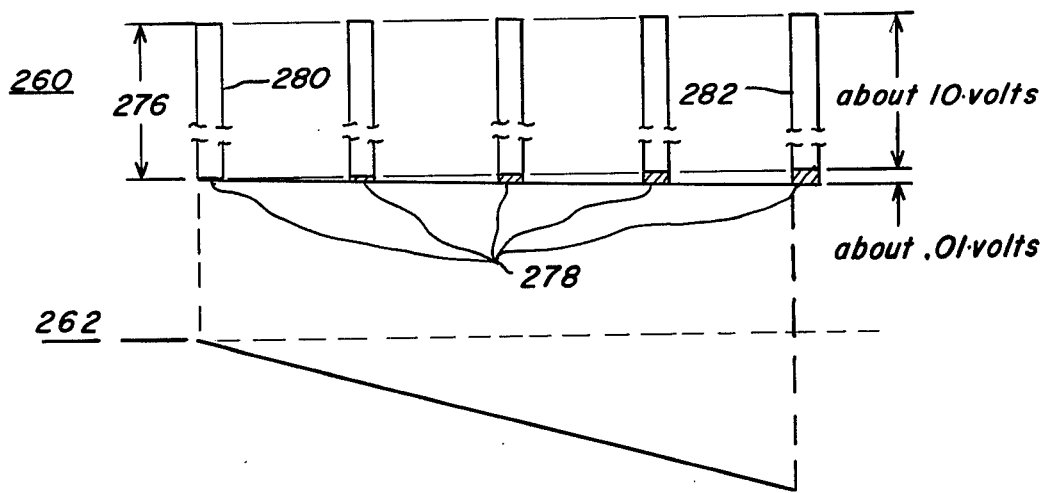
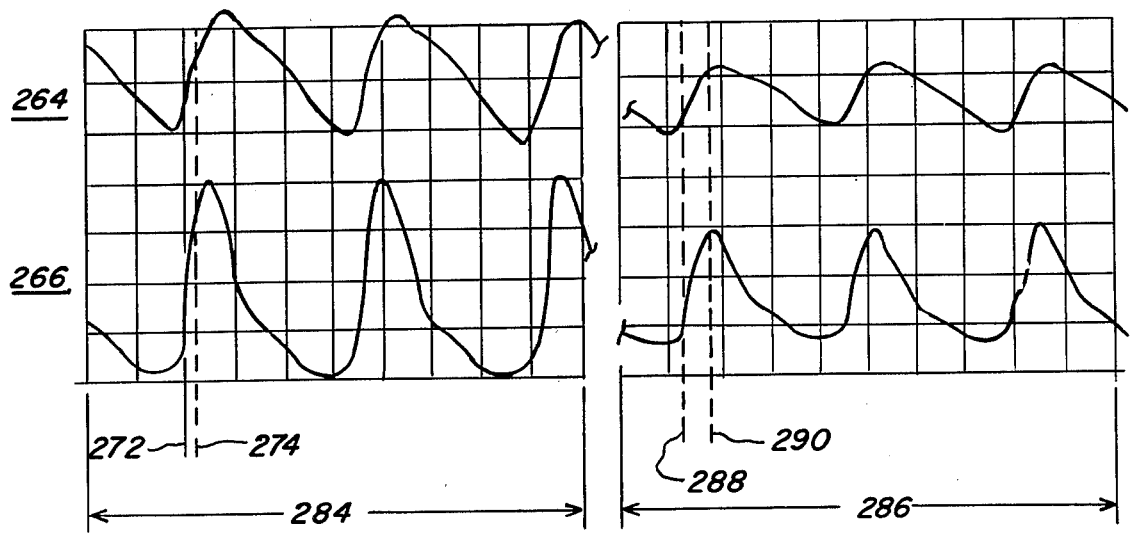

LEFT VENTRICULAR EJECTION METER

RELATED APPLICATIONS

This application is related to the following applications: application Ser. No. 330,683 for Photoelectric Physiological Data Measuring Apparatus invented by J. E. Heule; and application Ser. No. 330,747 for Method of and Apparatus for measuring Physiological Diagnostic Data invented by Richard C. Gaard, M.D.

BACKGROUND AND FIELD OF THE INVENTION

This invention relates in general to the measurement of data representative of the general circulatory system, and in particular to measurement of parameters representative of the principal organ of the circulatory system, the heart.

The prior art is replete with devices which measure general circulatory system parameters such as blood pressure, pulse rate and blood flow volume. Generally, such data has been considered as indicative of the operation of the heart. Other devices also provide data representative of the heart in the form of what are referred to as waveforms. Examples of these latter devices are the electrocardiograph and oscillometer while the former include catheters and sphygmomonometers.

The prior art also includes various methods which, in part at least, measure the operation of the heart left ventricle. For example there are dye dilution studies and angiographic studies. In a dye dilution study, a dye of known density is introduced into the left ventricle. Subsequently, a sample of blood is withdrawn at a point a known distance from the heart. By calculating the density of the blood sample, the output from the left ventricle can in turn be calculated. An angiographic study is similar in that a dye is also introduced into the ventricle; however, this dye is X-ray opaque and the determination as to ventricle operation is made by viewing X-rays which of course will show the manner in which the dye stained blood is ejected from the ventricle. While both angiographic and dye dilution studies provide precise measurements and indications of the performance of the left ventricle, both are invasive. Both typically involve insertion of a catheter into an artery or vein and pushing the catheter along the artery to the heart. It is now recognized in modern day cardiology that the most important heart characteristic is that of the left ventricle. Consequently, the physical discomfort experienced by the patient, and the expense and complexity of the test apparatus is offset by the importance of the data obtained by the tests, although frequently, less precise data would be acceptable.

Briefly, the left ventricle ejection phase of a heart beat cycle is expressed in terms of the heart output volume and force. In the prior art, the conventional indicator of left ventricle performance has been a waveform of the pulsatile blood flow from the ventricle. For each pulse of a waveform, the area under the curve corresponds to volume, and the peak amplitude and the systolic slope of the curve represent force. (The diastolic slope of a waveform is that portion of a waveform from a diastolic point to the following systolic point.)

To illustrate the importance of heart left ventricular ejection, the diagnosis of the pathologies of ventricular aneurism, ventricular hypertrophy and post-myocardial infarction each can be based primarily upon the heart left ventricular ejection parameter. In laymen's language, a ventricular aneurism is a weakness in the heart muscle resulting in the weakened area expanding like a balloon as the ventricule builds up pressure to force blood from the heart; a ventricular hypertrophy is an athletic heart i.e. a heart which is muscularly developed more than normal; and, a post-myocardial infarction is an obstruction to the blood flow on the input side (as opposed to output side) of the heart myocardial muscle.

Although the prior art devices, and methods of diagnosis based on the data obtained thereby, measure the important left ventricular ejection data, the total measured data also includes data of lesser significance. This less significant data, tends to mask, obscure, or otherwise detract from a clear presentation of the relevant data. This is true even of data obtained by those devices known as "invasive" devices the specific functions of which include measurement of data representative of the heart left ventricle. (Invasive devices are those devices which "invade" the body i.e. those which are surgically inserted; the foregoing described angiographic and dye dilution methods both employ invasive devices.)

It will also be appreciated that many, indeed most, diagnoses are based not on a single parameter, but rather on several. An example of one apparatus specifically designed to simultaneously provide a diagnostician with measurements of multiple parameters is the subject matter of the above referred to invention for Physiological Data Measuring Apparatus. One of the multiple measurements is that of tissue perfusion which, as pointed out in the description relative thereto, preferably is a measurement of an area the circulation of which is predominantly microcirculatory. As is likewise discussed in the disclosure of the multiple measurement invention, the left ventricular ejection characteristics typically are significantly attenuated in the blood volume waveform characteristics of a microcirculatory area.

It is a general object of the present invention to provide apparatus for measurement of data representative of the general circulatory system.

An object of the present invention is to provide apparatus for measurement of data representative of performance of the heart.

Another object of the present invention is to provide apparatus for measurement of that portion of a heart cycle referred to as left ventricle ejection.

Yet another object of the present invention is to provide apparatus for measurement of heart left ventricule ejection preferentially to other portions of the heart beat cycle.

A further object of the invention is a non-invasive apparatus for the method of measurement of the heart left ventricle ejection parameter.

An additional object of the invention is an apparatus for measurement of the heart left ventricular ejection parameter based on a measurement of a microcirculatory area.

An object of the invention is an apparatus which restores the left ventricular ejection characteristic to a blood volume waveform measurement of the circulation of a microcirculatory area.

Still another object of the present invention is a method of diagnosis by measuring the heart left ventricular ejection phase preferentially to other phases of the heart beat cycle.

An object of the present invention is to provide a method of diagnosis based upon isolating the data representative of left ventricular ejection from the total data representative of heart performance.

BRIEF DESCRIPTION OF INVENTION

Briefly, according to a preferred embodiment of the present invention, a method and apparatus is provided which not only preferentially measure data representative of the left ventricular ejection (LVE) phase of the heart beat cycle, but provide some indications as to other general circulatory system parameters as well.

According to the present invention, LVE is isolated from or positively emphasized with respect to non-LVE data, or the non-LVE data is attenuated or is preferentially measured by a combination of isolation, positive emphasis, and attenuation. The degree of emphasis or isolation can, of course, vary according to the particular circumstances. For example, diagnosis of certain pathological conditions, diseases, and disorders may be made on the LVE data alone, while diagnosis of others requires consideration of the LVE data with other data. The degree of emphasis, emphasis being subjective in nature, will also vary according to the individual interpreting the data, but obviously need not be total isolation of the LVE data.

Conveniently, the data representative of heart LVE, at least such data as is representative of healthy, properly operating hearts, is characterized by a blood flow rate of change greater than most other portions of the heart beat cycle. Preferential emphasis of the LVE portion of the heart beat cycle is therefore readily provided by a frequency sensitive circuit. According to a preferred embodiment of the invention, a circuit is employed which readily passes signals in the range of about 3.75 to 6.75 Hz. and attenuates signals outside the range, it having been found that LVE signals fall within this range. It should be noted that the data provided by such an embodiment does not totally isolate the LVE data, as the systolic slope data in particular also falls within the range.

BRIEF DESCRIPTION OF THE DRAWINGS

FIG. 1 is a block diagram of apparatus according to the present invention;

FIG. 2 is a schematic diagram of an implementation of the apparatus of FIG. 1 by means of discrete components.

FIG. 4 is an illustration of waveforms of the circuit of FIG. 2 showing a comparison of unemphasized and emphasized signals.

DETAILED DESCRIPTION OF INVENTION

Figure 3:
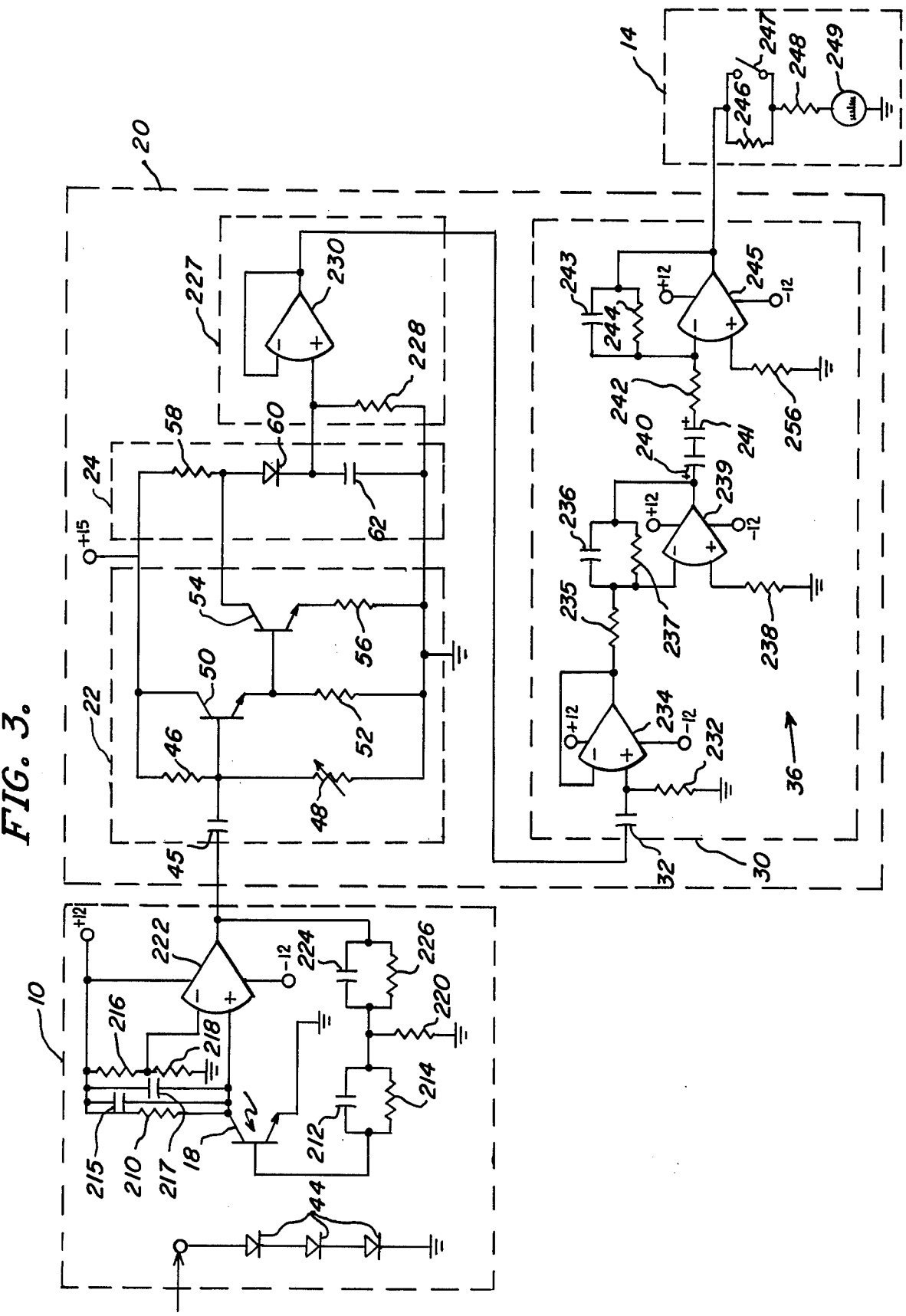
FIG. 3 is a schematic diagram of an implementation of the apparatus of FIG. 1 principally by means of integrated circuits.

According to the illustration of FIG. 1, a block diagram of the present invention is shown as comprising a probe 10, an emphasis circuit 12, and an LVE meter 14. The probe 10 may be any of a variety of such devices known in the art which provide a signal including a component representative of the general circulatory system pulse waveform. Examples of such probes are disclosed in numerous United States patents, including U.S. Pat. No. 3,230,951 which issued Jan. 25, 1966 to B. M. Teschner; and, U.S. Pat. No. 3,083,705 which issued Apr. 2, 1963 to Carl A. Johnson. Meter 14 similarly can be any of a variety of state of the art devices examples of which are also set forth in the Teschner and Johnson patents.

The emphasis circuit 12 produces a new result, namely a preferential measurement of the heart left ventricle ejection data. Emphasis may consist of one or a combination of amplification of the LVE phase, attenuation of the heart beat phases other than LVE, or total isolation of the LVE phase. The effect of emphasis is, in all cases, relative emphasis of the LVE data and in the case of data measured from a microcirculatory area, emphasis is effectively the restoration of the LVE characteristic. Filters, tuned circuits, and A-C amplifiers are examples of band pass circuits which amplify signals within a particular range and attenuate all other signals; as previously stated, the band pass (range) of such circuits should be about 3.75 to 6.75 Hz.

Referring now to FIG. 2, a schematic diagram of a probe 10, emphasis circuit 12, and LVE meter 14 implemented by means of discrete components is shown.

Briefly, the probe 10 introduces pulses of light into a measurement area by means of a light source shown generally as 16 and receives reflections of said light, as modulated by the circulation of the measurement area, by means of phototransistor 18. For such a photoelectric probe, an interface section 20 is employed which demodulates the signal provided by probe 10. The interface section 20 extracts high frequency non-meaningful components and integrates-out non-meaningful low frequency components of the composite signal representative of the modulated light reflections received by phototransistor 18, in addition to providing signal amplification and impedance matching to the circuits with which it interfaces. (High and low frequency are used here in a relative sense and not in the strict, technical sense of a frequency band width as set forth in electronic standards manuals.) Interface section 20 includes an input section 22, demodulator section 24, impedance matching section 26, and amplification section 28, the manner of operation of the probe 10 and these sections of interface section 20 are set forth in the disclosure of the aforementioned application for the invention for Physiological Data Measuring Apparatus, which disclosure is hereby incorporated by reference.

Also included in interface section 20 is an emphasis section 30. The emphasis section consists primarily of capacitor 32, the value of which is selected to provide attenuation of signals less than 3.75 Hz. and of shunt capacitor 34 the value of which is selected to attenuate signals above 6.75 Hz. It is understood of course that the present invention is not limited to such a series and shunt capacitor circuit arrangement, but includes all circuit configurations with a uniform gain band pass of from 3.75 to 6.75 Hz., ie, it includes those circuits which attenuate or block other than the band pass frequency range, those which preferentially amplify the band pass frequency range, those which shunt other than the band pass frequency range, and those which employ a combination of attenuation, preferential amplification, and shunting. In the preferred embodiment of FIG. 2, the capacitors 32 and 34 of the emphasis section 30 have values which result in a frequency response curve the 3 db points of which are 0.63 Hz. and 40 Hz.; the curve is essentially flat within a range from 3.75 Hz. to 6.75 Hz. to emphasize components of the pulse waveform within this range. Briefly, the waveform components within this range are those representative of the heart beat phase known as "left ventricular ejection." When the probe 10 is positioned over an arterial measurement area, the effect of capacitors 32 and 34 is to preferentially pass the left ventricular ejection phase of a heart beat waveform and attenuate other phases of the waveform, particularly those immediately preceding and succeeding the left ventricular phase. When the probe 10 is positioned over a microcirculatory area, the waveform represents blood flow in vessels small compared to the arteries and, usually, at a significant distance from the heart. The blood waveform loses some of the waveform arterial characteristics, including the steepness of the slope of the waveform leading edge, of each heart beat pusle in traveling such a distance and as a result of the damping effect of the small vessels of the microcirculation. This leading edge corresponds to the left ventricular ejection phase of the heart beat cycle. When the probe 10 is positioned over a microcirculatory area, the effect of capacitors 32 and 34 is to restore the left ventricular ejection characteristic to the waveform thereby permitting a measurement of the microcirculation, typically used for indicating tissue perfusion, to also provide qualitative waveform data such as left ventricular ejection.

A description of meter 14 is included in the foregoing mentioned Physiological Data Measuring Apparatus.

The component descriptions of the components of the preferred embodiment of FIG. 2 are set forth in Table 1 below:

TABLE 1

Probe 10
$40 = 4.7 \times 10^6$ ohms   44 = Monsanto, ME 60 Light Emitting Dio de
$42 = 1 \times 10^3$ ohms    18 = Fairchild, FPF 130, Photo-Transistor Probe housing (no reference No.) electrically insulative material; can be fabricated from a 1.2 in. outside diameter slug of Delrin or bakelite having a bore of 1.12 in. dia. by 0.983 in. deep.

Having described how to make a specific preferred embodiment of the invention, and having discussed the general considerations and teachings which enable one of ordinary skill in the art to modify and construct equivalent embodiments of the invention as illustrated in and described with reference to FIG. 2, use of the embodiment of FIG. 2 shall now be described. Prior to its use, the system is calibrated in a manner as set forth in the aforementioned application for Physiological Data Measuring Apparatus. The probe 10 may be provided with a mounting strap such as are shown in one or more of the above referred to prior art patents, may be hand-positioned, or may be secured with adhesive tape, or any other suitable means so long as the probe 10 is secured free of movement and desirably secured so as not to affect the circulation such as by compression of circulatory vessels. Measurement of left ventricular ejection is enhanced by astute selection of the measurement area. For data representative of left ventricular ejection, an area including an artery, the neck for example, is a good measurement area.

With the light source 16, and the balance of the circuitry energized, pulses of light from source 16 having a duration of 100 micro-seconds, produced at a rate of 1000 Hz., and of about 935 micro-watts each are introduced into a measurement area. Phototransistor 18 receives reflections of the pulses and provides a signal representative of the reflected pusles to demodulator 12. Demodulator 12 integrates-out the low-frequency base component and extracts the high-frequency non-meaningful data to provide a demodulated signal of meaningful pulse waveform data to a measurement device such as LVE meter 14. Distortion is introduced Interface 20

Input 22
$46 =$ $300 \times 10^3$ ohms              $45 = 0.01$ micro-farads
$48 =$ $200 \times 10^3$ ohms, Trimpot, Spectrol 41    50 & 54 = 2N3392, NPN transistor
$52 =$ $1 \times 10^3$ ohms
$56 =$ 270 ohms Demodulator 24
$58 = 10 \times 10^3$ ohms                $62 = 0.1$ micro-farads
                                          60 = 1N4154 diode Impedance Matching 26
$65 = 47 \times 10^3$ ohms                64 = 2N3392, NPN transistor Amplification 28
$68 = 56 \times 10^3$ ohms                66 = 50 micro-farads; electrolytic
$70 = 8.2 \times 10^3$ ohms               74 = 2N3392, NPN transistor
$72 = 2.2 \times 10^3$ ohms
$76 =$ 220 ohms
$78 = 10 \times 10^3$ ohms, Trimpot, Spectral 41
$80 = 12 \times 10^3$ Emphasis 30
$82 =$ $430 \times 10^3$ ohms             32 = 1.0 micro-farad
$84 =$ $270 \times 10^3$ ohms             68 = .01 micro-farad
$86 =$ $100 \times 10^3$ ohms, Trimpot Spectral 41    90 = 2N3392, NPN transistor
                                          96 = 1N5229, Zener Diode
$98 =$ $43 \times 10^3$ ohms
$92 =$ $3.0 \times 10^3$ ohms
$94 =$ 560 ohms Meter 14
$88 = 1 \times 10^3$ ohms                 100 = 0–200 micro. amp., edgewise, D'Arsonval movement meter; Honeywell MCE 1
                                          102 = 1N4154 diode
                                          104 = 1N4154 diode into the waveform in order to emphasize the left ventricular ejection phase of the waveform by means of capacitors 32 and 34 or to restore the left ventricular ejection characteristic in the case of a measurement of a microcirculatory area. This emphasized waveform is indicated by the pointer movement of pointer indicator 100. From experience, for a measurement taken from the forehead, a normal healthy adult will produce a swing of indicator 100 of from a minimum of about 50 to a maximum of about 140 to 145. With the waveform emphasized by capacitors 32 and 34, certain characteristics of the left ventricular ejection phase of the heart beat are ascertainable from the nature of movement of pointer indicator 100. For example, a very rapid upward swing indicates a strong, rapid, ejection. Conversely, a slow upward swing indicates a slow ejection phase. Indications of indicator 100 are also obviously of utility on a comparative basis to show a change in the nature of the left ventricular ejection. As previously pointed out indicator 100 is not limited to a pointer indicator, but can be of any of numerous forms, including a waveform trace such as an oscilloscope display or strip recorder should an application require a less subtle representation of the waveform.

Another embodiment of the system is shown in FIG. 3. The system of FIG. 3 operates in substantially the same way as that of FIG. 2 to provide the same result. That is, the system of FIG. 3 introduces pulses of light into a measurement area, receives reflections of the pulses, and produces a pulse waveform signal representation of the reflections of the pulses. The system operates on the signal representation to provide indications of the left ventricular ejection phase of a heart beat. The details of construction and manner of operation of the probe 10 and interface section 20 are set forth in the application of the aforementioned invention for Physiological Data Measuring Apparatus. The emphasis section 30 includes capacitor 32 which performs the same function as the correspondingly numbered capacitor in FIG. 2. The equivalent of capacitor 34 of FIG. 2 is provided by the two stages of a gain and filter network shown generally as 36, each of which stages consists of a negative feedback operational amplifier.

The components for constructing the preferred embodiment illustrated in FIG. 3 are set forth in Table 2 below:

TABLE 2

Probe 10

| | |
|---|---|
| $210 = 3.9 \times 10^3$ ohms | $18 =$ Fairchild, FPF 130, phototransistor |
| $214 = 100 \times 10^3$ ohms | |
| $216 = 5.6 \times 10^3$ ohms | $44 =$ Monsanto, ME60 Light Emitting Diode |
| $218 = 5.6 \times 10^3$ ohms | |
| $220 = 4.7 \times 10^3$ ohms | $212 = 56$ pico-farads |
| $226 = 100 \times 10^3$ ohms | $215 = 0.01$ micro-farads |
| | $271 = 2.2$ micro-farads, 25 volt |
| | $222 =$ JEDEC, 741, IC operational amplifier |
| | $224 = 10$ pico-farads |

Input 22 and Demodulator 24 components are identical to their corresponding components of FIG. 1.

Output Section 227

| | |
|---|---|
| $228 = 1 \times 10^6$ ohms | $230 =$ JEDEC, 741, operational amplifier |

Emphasis 30

| | |
|---|---|
| $232 = 390 \times 10^3$ ohms | $32 = 1.0$ micro-farad |
| $235 = 8.2 \times 10^3$ ohms | $236 = 1.0$ microfarad |
| $237 = 39 \times 10^3$ ohms | $240$ & $241 = 100$ micro-farads; polarized capacitor rated at 16 volts w.v.d.c. |
| $238 = 7.5 \times 10^3$ ohms | |
| $242 = 8.2 \times 10^3$ ohms | |
| $244 = 82 \times 10^3$ ohms | |
| $246 = 7.5 \times 10^3$ ohms | |

Meter 14

| | |
|---|---|
| $246 = 100 \times 10^3$ ohms | $247 =$ switch |
| $248 = 100 \times 10^3$ ohms | $249 = 0$–$200$ micro ampere, edgewise D'Arsonval movement meter; Honeywell MCE 1 |

Referring now to FIG. 4, a series of waveforms are shown as 260, 262, 264 and 266. Waveform 260 corresponds to a composite signal and waveform 262 corresponds to a signal having the low-frequency and high-frequency non-meaningful data removed. Waveforms 264 and 266 are actual oscilloscope traces of waveforms of unemphasized and emphasized waveforms, respectively. Waveform 264 was taken from the collector of amplifier 74 and waveform 276 was taken from node 75. The waveforms 260 and 262 represent the period of time illustrated on waveform 266 as 272 to 274, a period of approximately five one-hundreths of a second. Waveforms 260 and 262 include only about every 10th pulse, the other pulses having been omitted for the sake of clarity. Waveform 260 is representative of a waveform at the base of amplifier 50. Briefly, waveform 260 illustrates a waveform having a nearly constant non-meaningful data signal component 276 of about 10 volts and a meaningful data component 278 which varies from about zero volts for pulse 280 to about one-hundredth of a volt for pulse 282. Waveform 262 is waveform 260 following amplitude reduction by amplifier 50, inversion and amplification by amplifier 54, and after integration-out of the base-component by capacitor 62 and amplification by amplifier 64. Waveforms 264 and 266 have two periods shown as periods 284 and 286. Period 284 is the waveform resulting following moderate stress of the circulatory system (coughing) and period 284 is a waveform taken during light manual work activity involving practically no physical strain or exertion. The period 284 waveform shows a pulse rate of about 85 beats per minute, pulse amplitude of 8, and a slope of 4/.25 or 16 and a pulse rate of about 100 beats per minute, as compared with a pulse amplitude of about 5.0, and a left ventricular ejection having a slope (the slope from points 288 to 290) of about 2/.55 or 3.6, for period 286.

What is claimed is:

1. An apparatus for measuring and indicating the left ventricular output of the heart by monitoring light reflective characteristics of blood flow in blood vessels and capillaries, comprising:

a. a pulsating light source placed in proximity to said blood vessels and capillaries;

b. a light responsive element placed in reflective relationship to said light source and said blood vessels and capillaries, and having means for converting received light into electrical signals;

c. circuit means, connected to said light responsive element, for receiving said electrical signals and attenuating frequency components of said signals below about 0.6 Hz. and above about 40 Hz.; and d. indicator means, connected to said circuit means, for providing an observable indication of said nonattenuated electrical signals.

2. The apparatus of claim 1 wherein said circuit means further comprises a band pass circuit portion for emphasizing signal frequencies in the range of 3.75 Hz. to 6.75 Hz.

3. The apparatus of claim 2 wherein said band pass circuit further comprises a first capacitor in series connection with said light responsive element and a second capacitor in shunt connection with said light responsive element.

4. The apparatus of claim 2 wherein said band pass circuit portion further comprises means for attenuating signals outside the frequency range about 0.6–40 Hz. by at least 3 decibels.

5. The apparatus of claim 1 wherein said indicator means further comprises a current meter.

6. The apparatus of claim 1 wherein said pulsating light source is pulsated at a frequency of about 1000 Hz. and having a light pulse duration of about 100 micro-seconds.

* * * * *